May 21, 1957 V. H. FRAZIER 2,792,812
DOG COLLAR
Filed June 17, 1955 2 Sheets-Sheet 1

INVENTOR
VIRGIL H. FRAZIER
BY
ATTORNEY

May 21, 1957  V. H. FRAZIER  2,792,812
DOG COLLAR
Filed June 17, 1955  2 Sheets-Sheet 2
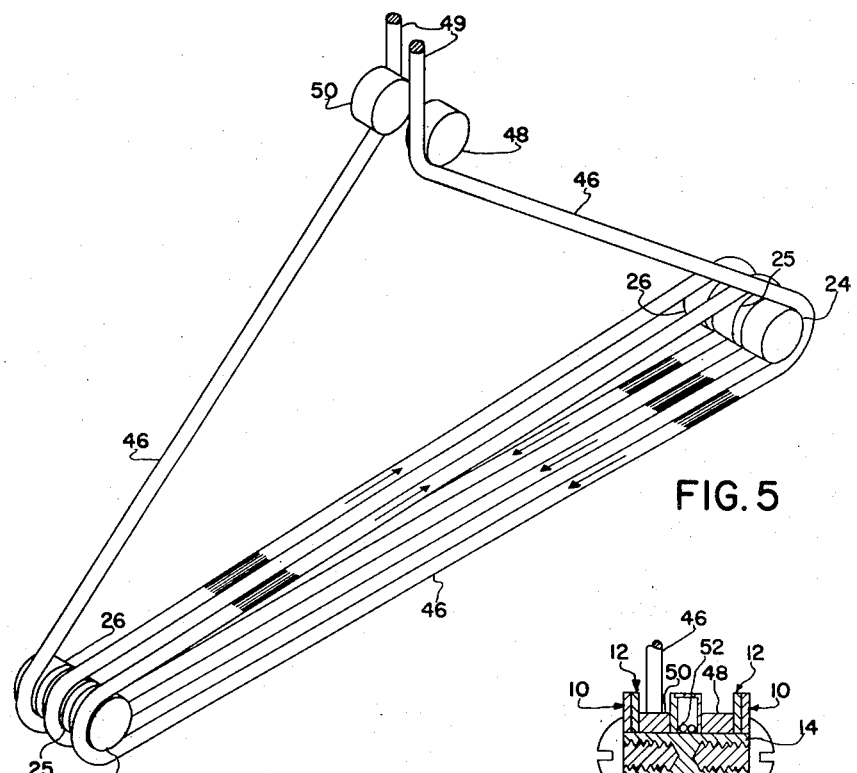
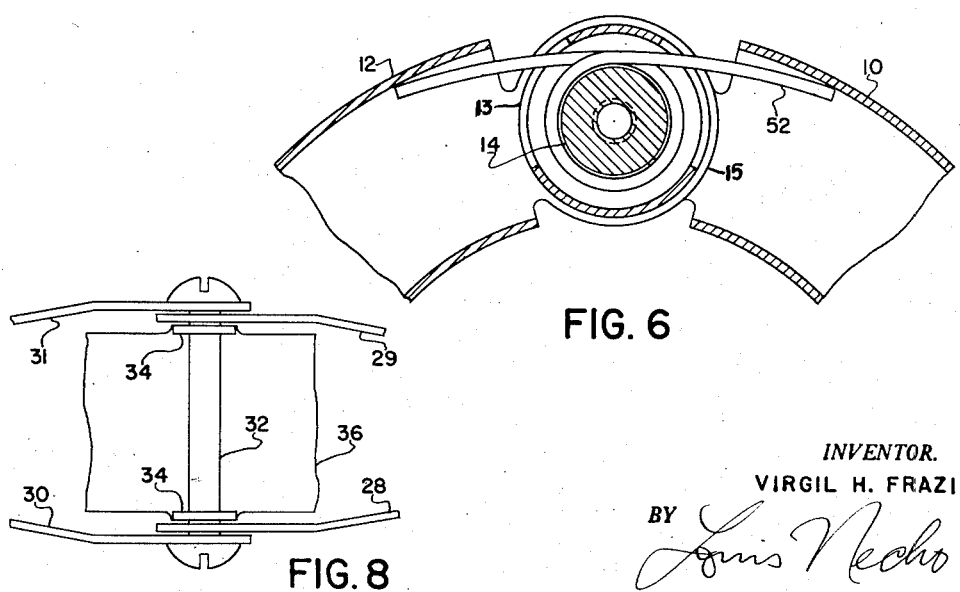
INVENTOR.
VIRGIL H. FRAZIER
BY
ATTORNEY United States Patent Office 2,792,812
Patented May 21, 1957

2,792,812
DOG COLLAR
Virgil H. Frazier, Philadelphia, Pa.
Application June 17, 1955, Serial No. 516,133
1 Claim. (Cl. 119—106)

My invention relates to an animal restraining device and, more particularly, to a dog collar especially adapted for restraining a powerful or ill-trained dog.

A large dog on a leash can exert more pull than an average person handling the dog can withstand comfortably or for any prolonged period of time. This is especially true in the case of women even if the dog is not large or exceptionally strong or ill-trained.

In recognition of this problem it has heretofore been proposed to use a choke collar which is formed by passing one end of a relatively narrow chain through a ring at the other end of the chain before it is attached to the lead end of the leash. This collar serves to choke or cut off the wind of the animal. But a strong dog can do a lot of damage before he is winded.

To overcome this difficulty it has further been proposed to design a choke collar which incorporates the principle of mechanical advantage so as to multiply the pressure produced against the animal's neck as a result of tugging and pulling by the animal.

Devices of this type are operative but the use of a narrow chain against the animal's skin chafes the hair and produces sores and the slip knot, once tightened, tends to stay tightened after the animal has stopped tugging and has to be loosened either by the person handling the dog or by subsequent multi-directional movements of the animal. This was not only unnecessarily cruel, but it also had no disciplinary value because if the pressure which is exerted on the dog's neck by his tugging is not relieved simultaneously with the cessation of the tugging, no association will be formed between pain and tugging and the animal is likely to become frustrated and ill-tempered.

It is therefore the object of the invention to produce an improved dog collar which will exert a very effective restraining pressure, but which will not injure the animal's hair or skin, and which is responsive to the behaviour of the animal in that tugging produces immediate discomfort and easing up on the leash produces an equally immediate relief.

The full nature of the invention will be understood from the following specification and the accompanying drawings in which:

Fig. 5 is a perspective view of some of the operating parts being shown detached better to illustrate the manner of operation.

Fig. 6 is an enlarged, fragmentary, vertical sectional view of the central upper portion of Fig. 1.

Fig. 7 is a fragmentary sectional view on line 7—7 on Fig. 1.

Fig. 8 is a sectional view looking in the direction of line 8—8 on Fig. 1.

Figure 1:
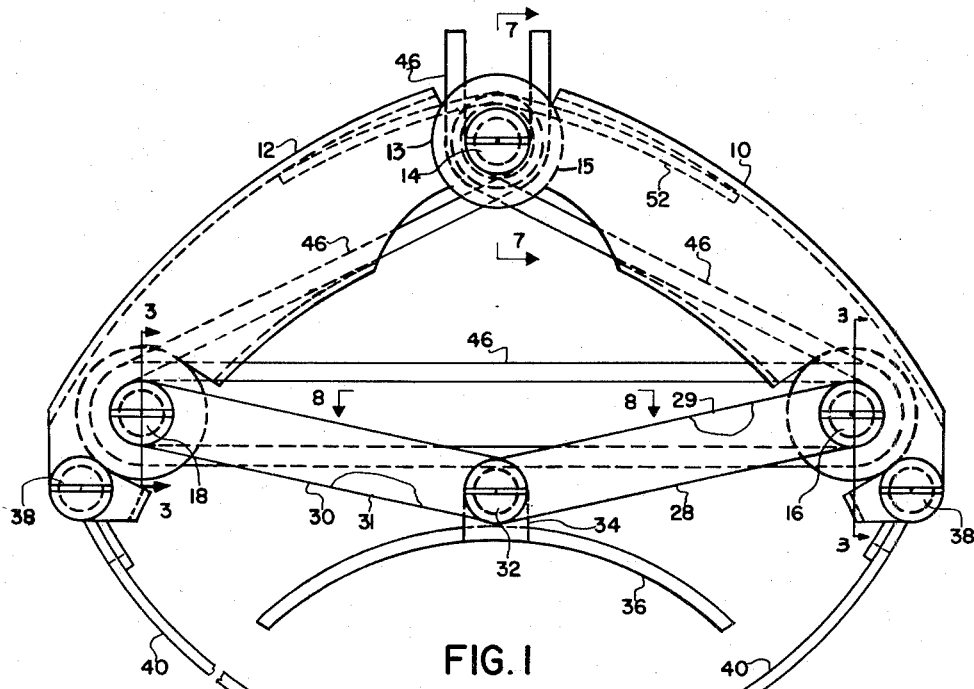
Fig. 1 is a side elevational view of a dog collar with parts shown in relaxed or non-pressure applying position.

The dog restraining device illustrated includes two slightly arcuate arms 10 and 12 which are generally U-shape in cross section, and the adjacent ends 13 and 15 of which are pivotally connected by a combined pivot and spacer pin 14. Near its opposite end arm 12 carries a stub shaft 18 which carries discs 20 and 21 which cooperate with the walls 22 and 23 of arm 12 to form pulleys 24, 25 and 26. In this connection, it is pointed out that Fig. 3 may also be considered as a vertical section through the center of stub shaft 16 and that the structure associated with stub shaft 16 is identical with that described in connection with stub shaft 18.

Stub shaft 16 pivotally carries a pair of spaced links 28 and 29 and stub shaft 18 pivotally carries a similar pair of links 30 and 31. See Figs. 2 and 3. Links 28 and 29 and 30 and 31 carry a combined spacer and pivot pin 32 which also pivotally engages spaced ears of a curved pressure plate 36. See Figs. 2 and 8. The ends of arms 10 and 12 beyond pins 16 and 18 carry pins 38 to which are suitably secured the upper ends of straps 40, the lower ends of which are detachably interconnected by a buckle 42.

Figures 2, 3, 4:
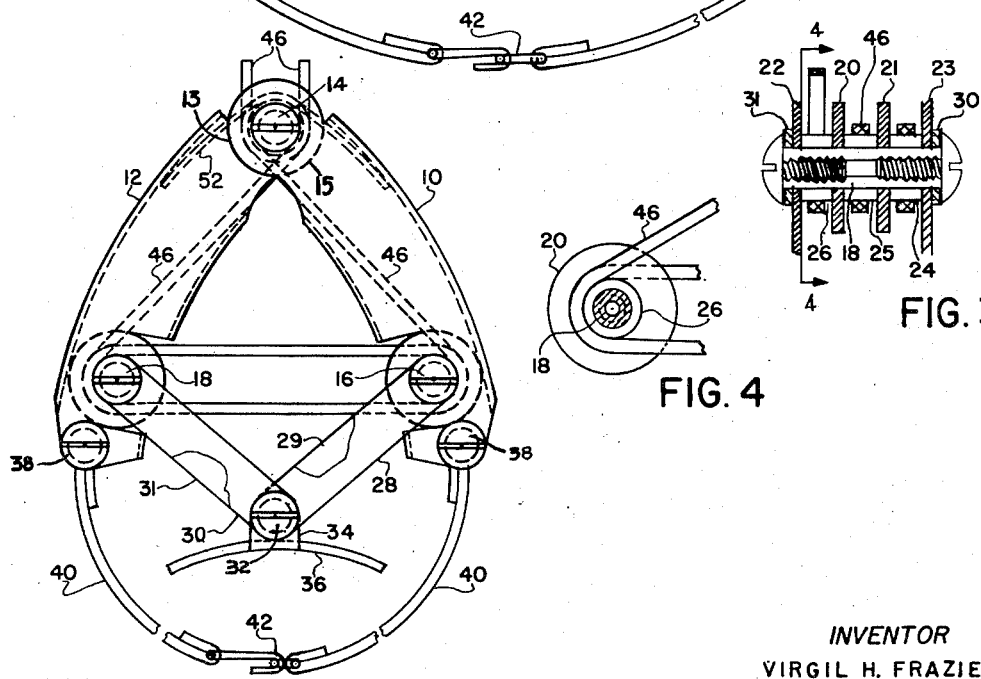
Fig. 2 is similar to Fig. 1, but showing the parts in tightened, or pressure applying position, as when the dog tugs hard on the leash.
Fig. 3 is a section on line 3—3 on Fig. 1.
Fig. 4 is a section on line 4—4 on Fig. 3.

In order to move the parts from the non-pressure applying position of Fig. 1 to the position of Fig. 2 in which pressure plate 36 is forced down on the back of the neck of the dog whenever the dog tugs on the leash, I provide a tape 46 which is passed around pulleys 24, 25 and 26 on stub shafts 16 and 18, as best shown in Fig. 5, and into engagement with rolls 48 and 50. The tape may be continued to form the leash and it may be detachably connected to the end of a conventional leash. By this arrangement, when the dog tugs on the leash, the tape 46 is pulley outwardly and thus moves stub shafts 16 and 18 from the position of Fig. 1 to that of Fig. 2 whereby the neck of the dog will be squeezed between pressure plate 36 and straps 40. The multiple pulley arrangement of Fig. 3 provides mechanical advantage.

In order to relieve the pressure as soon as the dog stops tugging, I provide flat spring 52, which is carried by spacer rod 14 and which normally biases arms 10 and 12 from the position of Fig. 2 to the position of Fig. 1.

What I claim is:

An animal restraining device including a pair of slightly arcuate arms, a pivot interconnecting adjacent ends of arms, a spring acting on said adjacent ends and operative to spread the opposite ends of said arms apart, a stub shaft carried by each of said outer ends, pulleys carried by said stub shafts, a tape having its central portion wound on said pulleys, a pair of links pivotally mounted on said stub shafts wtih their other ends converging, a pressure plate pivotally connected to the converging ends of said links, and adapted to bear on the top side of the animal's neck, and a strap carried by the ends of said arms and adapted to bear on the underside of the animal's neck, said arms, said links and said pulleys being so proportioned and arranged that a pull on the free ends of said tape draws said pulleys toward each other and forces said pressure plate down on the animal's neck against the action of said spring, and so that, when the pull on said tape is relieved, said spring pushes said pulleys apart and raises said pressure plate out of engagement with the animal's neck.

References Cited in the file of this patent
UNITED STATES PATENTS

| | | |
|---|---|---|
| 441,706 | Schneider | Dec. 2, 1890 |
| 895,309 | Schrepfer | Aug. 4, 1908 |
| 2,250,171 | Wilkins | July 22, 1941 |
| 2,314,504 | Lifchultz | Mar. 23, 1943 |